US012685967B2

(12) United States Patent
Ito

(10) Patent No.: US 12,685,967 B2
(45) Date of Patent: Jul. 21, 2026

(54) HOLLOW FIBER MEMBRANE MODULE

(71) Applicant: NOK CORPORATION, Tokyo (JP)

(72) Inventor: Yosuke Ito, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 324 days.

(21) Appl. No.: 18/293,989

(22) PCT Filed: Jul. 7, 2022

(86) PCT No.: PCT/JP2022/026917
§ 371 (c)(1),
(2) Date: Jan. 31, 2024

(87) PCT Pub. No.: WO2023/058284
PCT Pub. Date: Apr. 13, 2023

(65) Prior Publication Data
US 2024/0375052 A1 Nov. 14, 2024

(30) Foreign Application Priority Data
Oct. 6, 2021 (JP) ................................. 2021-164475

(51) Int. Cl.
*B01D 63/02* (2006.01)
*B01D 53/22* (2006.01)
(Continued)

(52) U.S. Cl.
CPC ........... *B01D 63/02* (2013.01); *B01D 53/228* (2013.01); *B01D 53/268* (2013.01);
(Continued)

(58) Field of Classification Search
CPC .... B01D 53/228; B01D 53/268; B01D 33/02; B01D 63/04; B01D 63/043; B01D 69/08;
(Continued)

(56) References Cited

U.S. PATENT DOCUMENTS

2007/0095741 A1 5/2007 Berends
2015/0107453 A1 4/2015 Usuda et al.
(Continued)

FOREIGN PATENT DOCUMENTS

JP 2005-98695 4/2005
JP 2007-93192 4/2007
(Continued)

OTHER PUBLICATIONS

International Search Report issued in International Patent Application No. PCT/JP2022/026917, dated Aug. 23, 2022.
(Continued)

*Primary Examiner* — Jennifer Dieterle
*Assistant Examiner* — Phillip Y Shao
(74) *Attorney, Agent, or Firm* — GREENBLUM & BERNSTEIN, P.L.C.

(57) ABSTRACT

Provided is a hollow fiber membrane module that allows reducing pressure loss of a dry gas and a moist gas. A hollow fiber membrane module has: a hollow fiber membrane bundle; a case in which the hollow fiber membrane bundle is accommodated; a pair of sealing and fixing parts that fixes the hollow fiber membrane bundle to the case; intra-membrane channels; and extra-membrane channels. Moisture in the moist gas is supplied into the dry gas by virtue of the membrane separation effect of the hollow fiber membranes. A first channel is provided, which runs through the case from one end side to the other end side and through which part of the dry gas flows without passing through the intra-membrane channels.

5 Claims, 6 Drawing Sheets

(51) Int. Cl.
    *B01D 53/26*        (2006.01)
    *H01M 8/04119*    (2016.01)

(52) U.S. Cl.
    CPC ... *H01M 8/04149* (2013.01); *B01D 2053/224*
        (2013.01); *B01D 2313/04* (2013.01); *B01D*
      *2313/08* (2013.01); *B01D 2313/203* (2022.08);
                       *B01D 2313/26* (2013.01)

(58) Field of Classification Search
    CPC .......... B01D 2053/224; B01D 2313/04; B01D
               2313/08; B01D 2313/083; B01D
               2313/203; B01D 2313/26; H01M
                     8/04149; Y02E 60/50
    See application file for complete search history.

(56)                    References Cited

U.S. PATENT DOCUMENTS

| | | | |
|---|---|---|---|
| 2015/0188162 A1 | 7/2015 | Lee et al. | |
| 2020/0353416 A1* | 11/2020 | Enomoto | .......... H01M 8/04141 |

FOREIGN PATENT DOCUMENTS

| | | |
|---|---|---|
| KR | 10-2021-0114716 | 9/2021 |
| WO | 2013/137313 | 9/2013 |
| WO | 2014/054740 | 4/2014 |

OTHER PUBLICATIONS

Extended European Search Report issued in EP Application No. 22878156.3, dated Nov. 20, 2024.

* cited by examiner

HOLLOW FIBER MEMBRANE MODULE

TECHNICAL FIELD

The present invention relates to a hollow fiber membrane module.

BACKGROUND ART

Hollow fiber membrane modules are provided in humidifiers that are used in automotive fuel cells. The size of hollow fiber membrane modules is tending to increase, with higher-output systems being demanded from such equipment. On the other hand, size reduction is called for, to address the issue of in-vehicle space. Although requirements in terms of humidification performance are being eased as the stack performance of fuel cells has improved, hollow fiber membrane modules in conventional structures nevertheless have to necessarily increase in size for the purpose of reducing pressure loss of dry gas and moist gas supplied to the hollow fiber membrane modules. Such a problem may arise not only in hollow fiber membrane modules in various humidifiers for fuel cells and others, but also in hollow fiber membrane modules used in dehumidifiers.

CITATION LIST

Patent Literature

[PTL 1]
WO 2014/054740

SUMMARY OF INVENTION

Technical Problem

The present invention provides a hollow fiber membrane module that allows reducing the pressure loss of dry gas and moist gas.

Solution to Problem

The present invention relies on the following means to solve the above problem.

Specifically, the hollow fiber membrane module of the present invention has:

a hollow fiber membrane bundle made up of a plurality of hollow fiber membranes;

a case of which both ends are open and in a housing interior of which the hollow fiber membrane bundle is accommodated;

a pair of sealing and fixing parts that seals respective openings at respective ends of the case in a state where a hollow interior of the hollow fiber membranes is left open and that fixes the hollow fiber membrane bundle to the case at one end side and another end side of the case;

intra-membrane channels in which a first gas flows from one end side of the case to the other end side of the case through the hollow interior of the plurality of hollow fiber membranes; and extra-membrane channels in which a second gas flows from an inlet formed in the case to an outlet formed in the case through the housing interior, one of the first gas and the second gas being a dry gas and the other being a moist gas having higher humidity than that of the dry gas, whereby moisture in the moist gas is supplied into the dry gas by virtue of a membrane separation effect of the hollow fiber membranes, wherein at least one of a first channel and a second channel is provided, the first channel runs through the case from one end side to the other end side and in which part of the first gas flows without passing through the intra-membrane channels, and the second channel runs through the case in a direction that intersects a direction from the one end side to the other end side of the case and through which part of the second gas flows without passing through the extra-membrane channels.

In a case where the first channel is provided, the present invention allows reducing pressure loss of the first gas, since part of the first gas flows through the first channel without passing through the intra-membrane channels. In a case where the second channel is provided, pressure loss of the second gas can be reduced since part of the second gas flows through the second channel without passing through the extra-membrane channels.

The housing interior may be divided into a plurality of sites by a partition wall, and the hollow fiber membrane bundle is thereby divisionally accommodated at the plurality of sites, the first channel being provided so as to run through the partition wall.

Preferably, the first channel may be provided so as to run through an outer wall of the case between an outer peripheral wall surface thereof and the housing interior.

Preferably, a tubular member, of which both ends are respectively fixed by the pair of sealing and fixing parts, may be also provided in the housing interior, and a tubular interior of the tubular member may be the first channel.

Preferably, the housing interior may be divided into a plurality of sites by a partition wall, and the hollow fiber membrane bundle is thereby divisionally accommodated at the plurality of sites, the second channel being provided so as to run through the partition wall.

Preferably, the second channel may be provided so as to run through an outer wall of the case between an outer peripheral wall surface thereof and the housing interior.

The above configurations may be combined with each other wherever possible.

Advantageous Effects of Invention

As explained above, the present invention allows reducing pressure loss of a dry gas and of a moist gas.

DESCRIPTION OF EMBODIMENTS

Modes for carrying out the present invention will be illustratively explained in detail below on the basis of embodiments, with reference to accompanying drawings. Unless otherwise stated, however, the dimensions, materials, shapes, relative arrangements and so forth of the constituent elements described in the embodiments are not meant to limit the scope of the present invention to the foregoing alone.

Embodiment 1

Figures 1A, 1B, 1C, 1D:
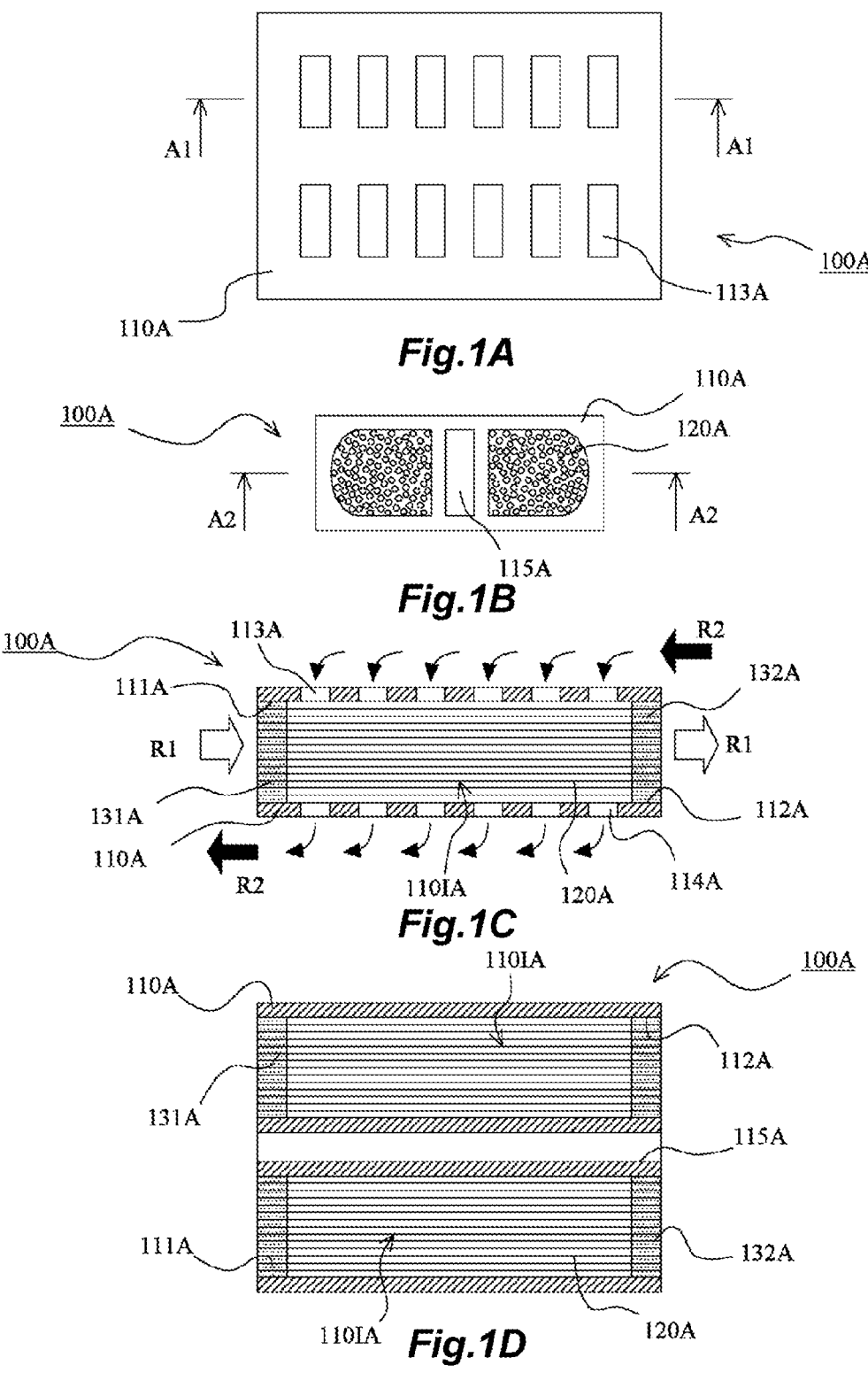
FIGS. 1A, 1B, 1C, and 1D are schematic configuration diagrams of a hollow fiber membrane module according to Embodiment 1 of the present invention.

A hollow fiber membrane module according to Embodiment 1 of the present invention will be explained next with reference to FIG. 1. FIG. 1 is a schematic configuration diagram of a hollow fiber membrane module according to Embodiment 1 of the present invention. FIG. 1(*a*) is a plan-view diagram of a hollow fiber membrane module, FIG. 1(*b*) is a front-view diagram of the hollow fiber membrane module, FIG. 1(*c*) is an A1-A1 cross-sectional diagram of FIG. 1(*a*), and FIG. 1(*d*) is an A2-A2 cross-sectional diagram of FIG. 1(*b*).

<Overview of the Hollow Fiber Membrane Module>

A hollow fiber membrane module 100A according to the present embodiment includes a case 110A, a hollow fiber membrane bundle 120A made up of a plurality of hollow fiber membranes accommodated in the case 110A, and a pair of sealing and fixing parts 131A, 132A that fixes the hollow fiber membrane bundle 120A to the case 110A. The case 110A is made up of a cuboid-shaped tubular member. The hollow fiber membrane bundle 120A is accommodated in a housing interior 110IA such that both ends of the case 110A thus configured are open. The pair of sealing and fixing parts 131A, 132A, at one end side and the other end side of the case 110A, seals respective openings 111A, 112A at respective ends of the case 110A in a state where the hollow interior of the hollow fiber membranes is left open, and fixes the hollow fiber membrane bundle 120A to the case 110A.

<Application Example of the Hollow Fiber Membrane Module>

An application example of the hollow fiber membrane module 100A according to the present embodiment will now be explained. The hollow fiber membrane module 100A according to the present embodiment can be used as a humidifier or a dehumidifier. Here follows a succinct explanation of this feature.

The hollow fiber membrane module 100A has intra-membrane channels passing through the interior of the plurality of hollow fiber membranes that make up the hollow fiber membrane bundle 120A, and extra-membrane channels passing over the exterior of the hollow fiber membranes. In the present embodiment, the intra-membrane channels are configured so that a dry gas as a first gas flows from one end side of the case 110A, through the hollow interior of the plurality of hollow fiber membranes, to the other end side of the case 110A (see arrows R1 in FIG. 1(*c*)). The extra-membrane channels are configured so that a moist gas as a second gas flows from inlets 113A formed in the case 110A, through the housing interior 110IA, to outlets 114A formed in the case 110A (FIG. 1(*c*), see arrows R2). The moist gas is more humid than the dry gas. A plurality of through-holes provided in one of a pair of plate-like portions of the case

110A corresponds to respective inlets 113A, while a plurality of through-holes provided in the other of the pair of plate-like portions corresponds to respective outlets 114A.

By virtue of the above configuration, moisture in the moist gas migrates into the dry gas on account of the membrane separation effect of the hollow fiber membranes. Therefore, the hollow fiber membranes can be used as both a humidifier and a dehumidifier since dry gas is humidified and moist gas is dehumidified.

The hollow fiber membrane module 100A according to the present embodiment can be suitably used as a humidifier for humidifying an electrolyte membrane that is provided in a fuel cell. In that case moist air generated in the fuel cell is used as the moist gas. The electrolyte membrane is thus maintained in a moist state through supply of humidified gas (air) to the electrolyte membrane that is provided in the fuel cell. For instance, PPSU (polyphenylsulfone) having the property of allowing moisture to permeate thanks to a capillary condensation mechanism based on pore size control can be used as appropriate herein as the material of the hollow fiber membranes. Preparation of a membrane-forming solution (starting material of the hollow fiber membranes) involves performing spinning using a membrane-forming solution resulting from adding PPSU and a hydrophilic polymer (polyvinyl pyrrolidone) to a solvent, to obtain as a result a hydrophilic hollow fiber membrane. It is also possible to use Nafion (registered trademark), which is a hydrophilic material having the property of letting moisture through by dissolution and diffusion. The above materials boast low elution properties and high strength, and accordingly can be suitably used in humidifiers and dehumidifiers.

<Details on the Hollow Fiber Membrane Module>

The hollow fiber membrane module 100A according to the present embodiment is provided with a first channel 115A running through from one end side to the other end side of the case 110A and through which part of the dry gas flows without passing through the housing interior 110IA. Specifically, the first channel 115A is provided so that part of the dry gas flows therethrough without passing through the intra-membrane channels. This first channel 115A will be explained more specifically next. The housing interior 110IA of the case 110A according to the present embodiment is divided by a partition wall. The hollow fiber membrane bundle 120A is thus divided and accommodated at two sites. The first channel 115A is provided so as to run through the above partition wall. In the present embodiment a configuration is depicted in which the housing interior 110IA is divided into two by one partition wall, but a configuration may be adopted in which the housing interior 110IA is divided into a plurality thereof by two or more partition walls. In that case the hollow fiber membrane bundle 120A is thus divided and accommodated at more sites. The first channel 115A can be provided in each partition wall.

The hollow fiber membrane module 100A thus configured allows reducing pressure loss of the dry gas, since part of the dry gas flows through the first channel 115A without passing through the housing interior 110IA of the case 110A (in other words, without passing through the intra-membrane channels). As a result, this allows curtailing increases in the size of the hollow fiber membrane module 100A.

Embodiment 2

Figures 2A, 2B, 2C, 2D:
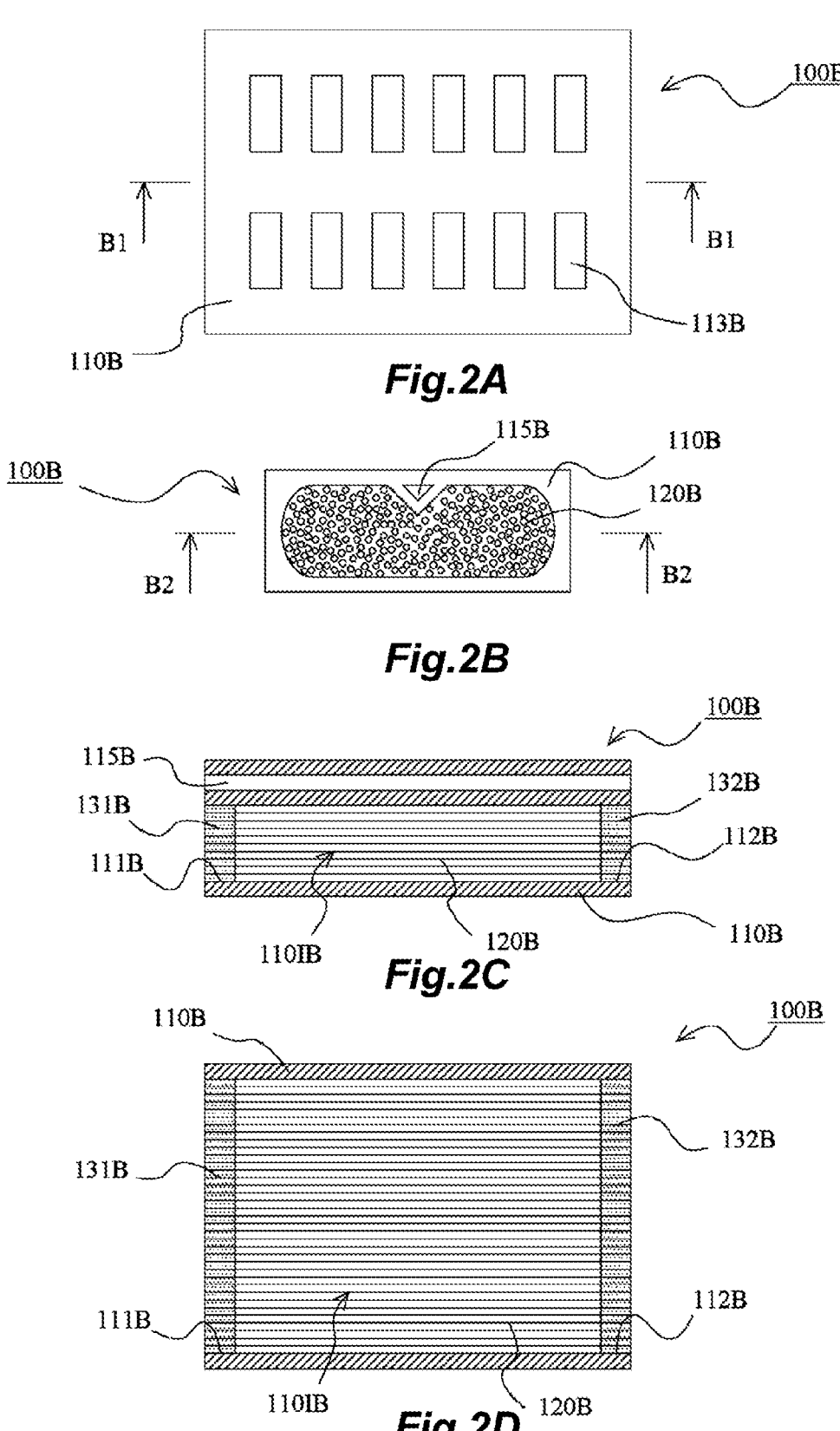
FIGS. 2A, 2B, 2C, and 2D are schematic configuration diagrams of a hollow fiber membrane module according to Embodiment 2 of the present invention.

A hollow fiber membrane module according to Embodiment 2 of the present invention will be explained with reference to FIG. 2. FIG. 2 is a schematic configuration diagram of a hollow fiber membrane module according to Embodiment 2 of the present invention. FIG. 2(*a*) is a plan-view diagram of a hollow fiber membrane module, FIG. 2(*b*) is a front-view diagram of the hollow fiber membrane module, FIG. 2(*c*) is a B1-B1 cross-sectional diagram of FIG. 2(*a*), and FIG. 2(*d*) is a B2-B2 cross-sectional diagram of FIG. 2(*b*).

<Overview of the Hollow Fiber Membrane Module>

A hollow fiber membrane module 100B according to the present embodiment includes a case 110B, a hollow fiber membrane bundle 120B made up of a plurality of hollow fiber membranes accommodated in the case 110B, and a pair of sealing and fixing parts 131B, 132B that fixes the hollow fiber membrane bundle 120B to the case 110B. The case 110B is made up of a cuboid-shaped tubular member. The hollow fiber membrane bundle 120B is accommodated in a housing interior 110IB such that both ends of the case 110B thus configured are open. The pair of sealing and fixing parts 131B, 132B, at one end side and the other end side of the case 110B, seals respective openings 111B, 112B at respective ends of the case 110B in a state where the hollow interior of the hollow fiber membranes is left open, and fixes the hollow fiber membrane bundle 120B to the case 110B.

<Application Example of the Hollow Fiber Membrane Module>

As explained concerning Embodiment 1, also the hollow fiber membrane module 100B according to the present embodiment can be used as a humidifier or a dehumidifier. The flow of dry gas and moist gas when the hollow fiber membrane module 100B is used as a humidifier or dehumidifier is as explained in Embodiment 1. That is, the intra-membrane channels are configured so that a dry gas flows from one end side of the case 110B, through the hollow interior of the plurality of hollow fiber membranes, to the other end side of the case 110B. The extra-membrane channels are configured so that a moist gas flows from inlets 113B formed in the case 110B, through the housing interior 110IB, to outlets formed in the case 110B. A plurality of through-holes provided in one of a pair of plate-like portions of the case 110B corresponds to respective inlets 113B, and a plurality of through-holes (not shown) provided in the other of the pair of plate-like portions corresponds to respective outlets.

The humidification and dehumidification mechanisms elicited by the membrane separation effect are as explained concerning Embodiment 1. Similarly to Embodiment 1, also the hollow fiber membrane module 100B according to the present embodiment can be suitably used as a humidifier for humidifying an electrolyte membrane that is provided in a fuel cell.

<Details on the Hollow Fiber Membrane Module>

Also the hollow fiber membrane module 100B according to the present embodiment is provided with a first channel 115B running through from one end side to the other end side of the case 110B and through which part of the dry gas flows without passing through the housing interior 110IB. Specifically, the first channel 115B is provided so that part of the dry gas flows therethrough without passing through the intra-membrane channels. This first channel 115B will be explained more specifically next. This first channel 115B is provided so as to run through an outer wall of the case 110B between the outer peripheral wall surface thereof and the housing interior 110IB. In the present embodiment an instance is illustrated in which the first channel 115B is provided at the width-direction center of a plate-like portion in which the plurality of inlets 113B is provided, but the position at which the first channel 115B is provided is not particularly limited. A configuration can also be adopted in which a plurality of first channels 115B is provided.

The hollow fiber membrane module 100B thus configured allows reducing pressure loss of the dry gas, since part of the dry gas flows through the first channel 115B without passing through the housing interior 110IB of the case 110B (in other words, without passing through the intra-membrane channels). As a result, this allows curtailing increases in the size of the hollow fiber membrane module 100B.

Embodiment 3

Figures 3A, 3B, 3C, 3D:
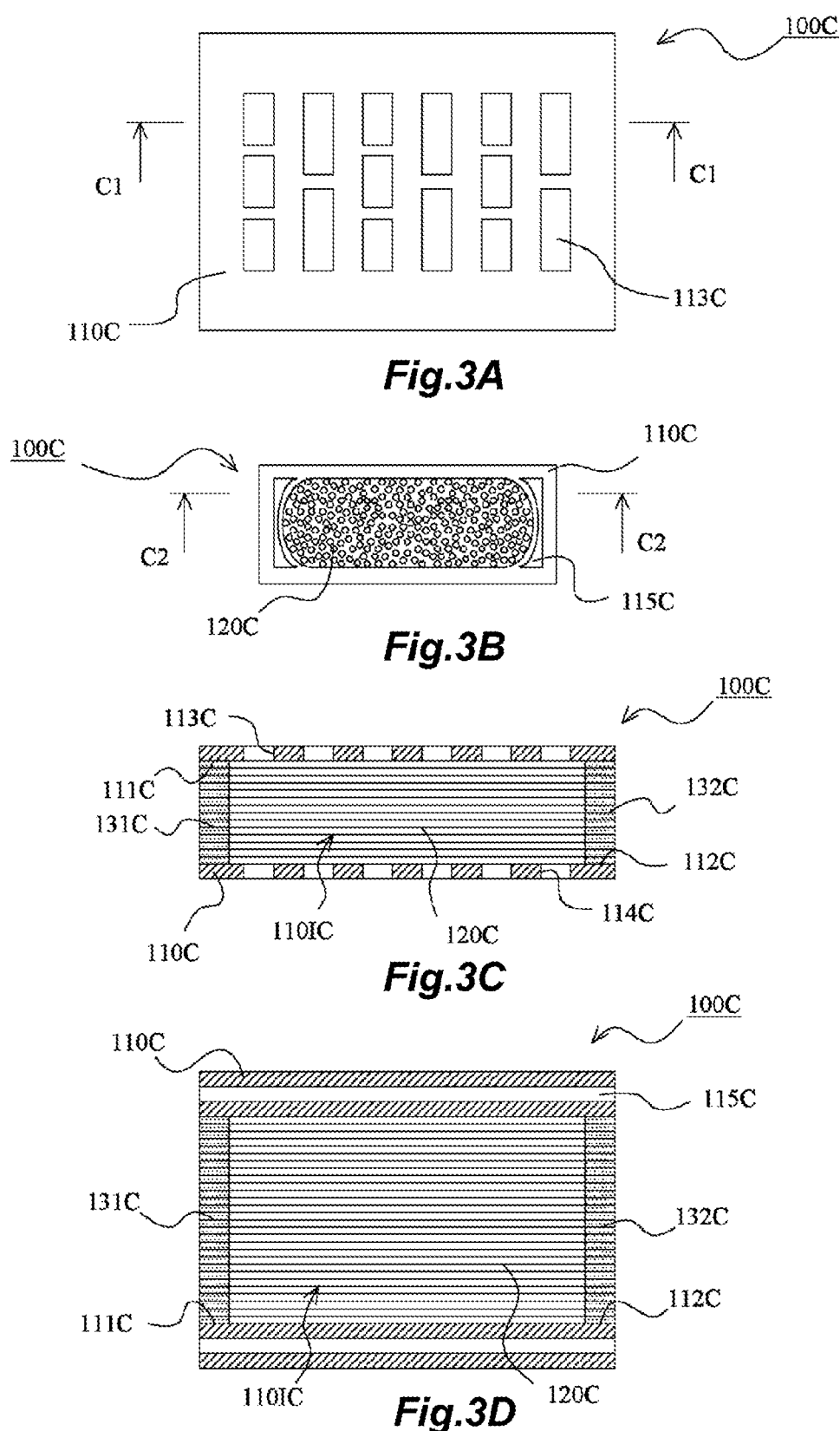
FIGS. 3A, 3B, 3C, and 3D are schematic configuration diagrams of a hollow fiber membrane module according to Embodiment 3 of the present invention.

A hollow fiber membrane module according to Embodiment 3 of the present invention will be explained with reference to FIG. 3. FIG. 3 is a schematic configuration diagram of a hollow fiber membrane module according to Embodiment 3 of the present invention. FIG. 3(*a*) is a plan-view diagram of a hollow fiber membrane module, FIG. 3(*b*) is a front-view diagram of the hollow fiber membrane module, FIG. 3(*c*) is a C1-C1 cross-sectional diagram of FIG. 3(*a*), and FIG. 3(*d*) is a C2-C2 cross-sectional diagram of FIG. 3(*b*).

<Overview of the Hollow Fiber Membrane Module>

A hollow fiber membrane module 100C according to the present embodiment includes a case 110C, a hollow fiber membrane bundle 120C made up of a plurality of hollow fiber membranes accommodated in the case 110C, and pair of sealing and fixing parts 131C, 132C that fixes the hollow fiber membrane bundle 120C to the case 110C. The case 110C is made up of a cuboid-shaped tubular member. The hollow fiber membrane bundle 120C is accommodated in a housing interior 110IC such that both ends of the case 110C thus configured are open. The pair of sealing and fixing parts 131C, 132C, at one end side and the other end side of the case 110C, seals respective openings 111C, 112C at respective ends of the case 110C in a state where the hollow interior of the hollow fiber membranes is left open, and fixes the hollow fiber membrane bundle 120C to the case 110C.

<Application Example of the Hollow Fiber Membrane Module>

As explained concerning Embodiment 1, also the hollow fiber membrane module 100C according to the present embodiment can be used as a humidifier or a dehumidifier. The flow of dry gas and moist gas when the hollow fiber membrane module 100C is used as a humidifier or dehumidifier is as explained in Embodiment 1. That is, the intra-membrane channels are configured so that a dry gas flows from one end side of the case 110C, through the hollow interior of the plurality of hollow fiber membranes, to the other end side of the case 110C. The extra-membrane channels are configured so that a moist gas flows from inlets 113C formed in the case 110C, through the housing interior 110IC, to outlets 114C formed in the case 110C. A plurality of through-holes provided in one of a pair of plate-like portions of the case 110C corresponds to respective inlets 113C, and a plurality of through-holes provided in the other of the pair of plate-like portions corresponds to respective outlets 114C.

The humidification and dehumidification mechanisms elicited by the membrane separation effect are as explained concerning Embodiment 1. Similarly to Embodiment 1, also the hollow fiber membrane module 100C according to the present embodiment can be suitably used as a humidifier for humidifying an electrolyte membrane that is provided in a fuel cell.

<Details on the Hollow Fiber Membrane Module>

Also the hollow fiber membrane module 100C according to the present embodiment is provided with a first channel 115C running through from one end side to the other end side of the case 110C and through which part of the dry gas flows without passing through the housing interior 110IC. Specifically, the first channel 115C is provided so that part of the dry gas flows therethrough without passing through the intra-membrane channels. This first channel 115C will be explained more specifically next. This first channel 115C is provided so as to run through an outer wall of the case 110C between the outer peripheral wall surface thereof and the housing interior 110IC. In the present embodiment an instance is illustrated in which the first channel 115C is provided on both sides of the housing interior 110IC in the width direction, but a configuration may also be adopted in which the first channel 115C is provided on one side alone.

The hollow fiber membrane module 100C thus configured allows reducing pressure loss of the dry gas, since part of the dry gas flows through the first channel 115C without passing through the housing interior 110IC of the case 110C (in other words, without passing through the intra-membrane channels. As a result, this allows curtailing increases in the size of the hollow fiber membrane module 100C.

Embodiment 4

Figures 4A, 4B, 4C, 4D:
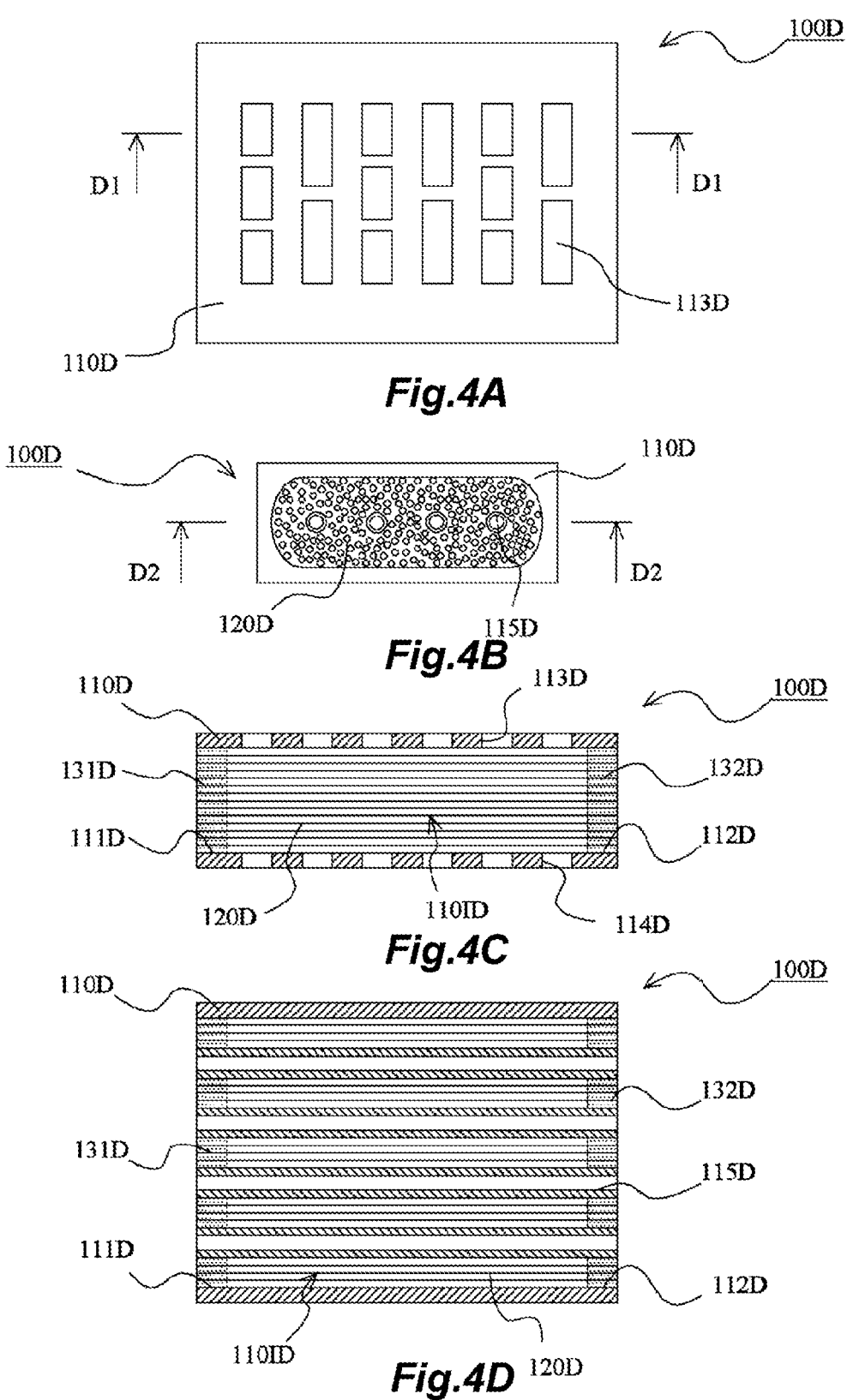
FIGS. 4A, 4B, 4C, and 4D are schematic configuration diagrams of a hollow fiber membrane module according to Embodiment 4 of the present invention.

A hollow fiber membrane module according to Embodiment 4 of the present invention will be explained with reference to FIG. 4. FIG. 4 is a schematic configuration diagram of a hollow fiber membrane module according to Embodiment 4 of the present invention. FIG. 4(*a*) is a plan-view diagram of a hollow fiber membrane module, FIG. 4(*b*) is a front-view diagram of the hollow fiber membrane module, FIG. 4(*c*) is a D1-D1 cross-sectional diagram of FIG. 4(*a*), and FIG. 4(*d*) is a D2-D2 cross-sectional diagram of FIG. 4(*b*).

<Overview of the Hollow Fiber Membrane Module>

A hollow fiber membrane module 100D according to the present embodiment includes a case 110D, a hollow fiber membrane bundle 120D made up of a plurality of hollow fiber membranes accommodated in the case 110D, and a pair of sealing and fixing parts 131D, 132D that fixes the hollow fiber membrane bundle 120D to the case 110D. The case 110D is made up of a cuboid-shaped tubular member. The hollow fiber membrane bundle 120D is accommodated in a housing interior 110ID such that both ends of the case 110D thus configured are open. The pair of sealing and fixing parts 131D, 132D, at one end side and the other end side of the case 110D, seals respective openings 111D, 112D at respective ends of the case 110D in a state where the hollow interior of the hollow fiber membranes is left open, and fixes the hollow fiber membrane bundle 120D to the case 110D.

<Application Example of the Hollow Fiber Membrane Module>

As explained concerning Embodiment 1, also the hollow fiber membrane module 100D according to the present embodiment can be used as a humidifier or a dehumidifier. The flow of dry gas and moist gas when the hollow fiber membrane module 100D is used as a humidifier or dehumidifier is as explained in Embodiment 1. That is, the intra-membrane channels are configured so that a dry gas flows from one end side of the case 110D, through the hollow interior of the plurality of hollow fiber membranes, to the other end side of the case 110D. The extra-membrane channels are configured so that a moist gas flows from inlets 113D formed in the case 110D, through the housing interior

110ID, to outlets 114D formed in the case 110D. A plurality of through-holes provided in one of a pair of plate-like portions of the case 110D corresponds to respective inlets 113D, and a plurality of through-holes provided in the other of the pair of plate-like portions corresponds to respective outlets 114D.

The humidification and dehumidification mechanisms elicited by the membrane separation effect are as explained concerning Embodiment 1. Similarly to Embodiment 1, also the hollow fiber membrane module 100D according to the present embodiment can be suitably used as a humidifier for humidifying an electrolyte membrane that is provided in a fuel cell.

<Details on the Hollow Fiber Membrane Module>

Also the hollow fiber membrane module 100D according to the present embodiment is provided with first channels 115D running through from one end side to the other end side of the case 110D and through which part of the dry gas flows without passing through the intra-membrane channels. This first channels 115D will be explained more specifically next. In the present embodiment there are tubular members disposed in the housing interior 110ID of the case 110D such that both ends of each tubular member are fixed by the pair of sealing and fixing parts 131D, 132D. The interiors of these tubular members correspond to the first channels 115D. In the present embodiment there are disposed four tubular members, so that four first channels 115D are provided, but the number of tubular members is not limited.

The hollow fiber membrane module 100D thus configured allows reducing pressure loss of the dry gas, since part of the dry gas flows through the first channels 115D without passing through the intra-membrane channels. As a result, this allows curtailing increases in the size of the hollow fiber membrane module 100D.

Embodiment 5

Figures 5A, 5B, 5C, 5D:
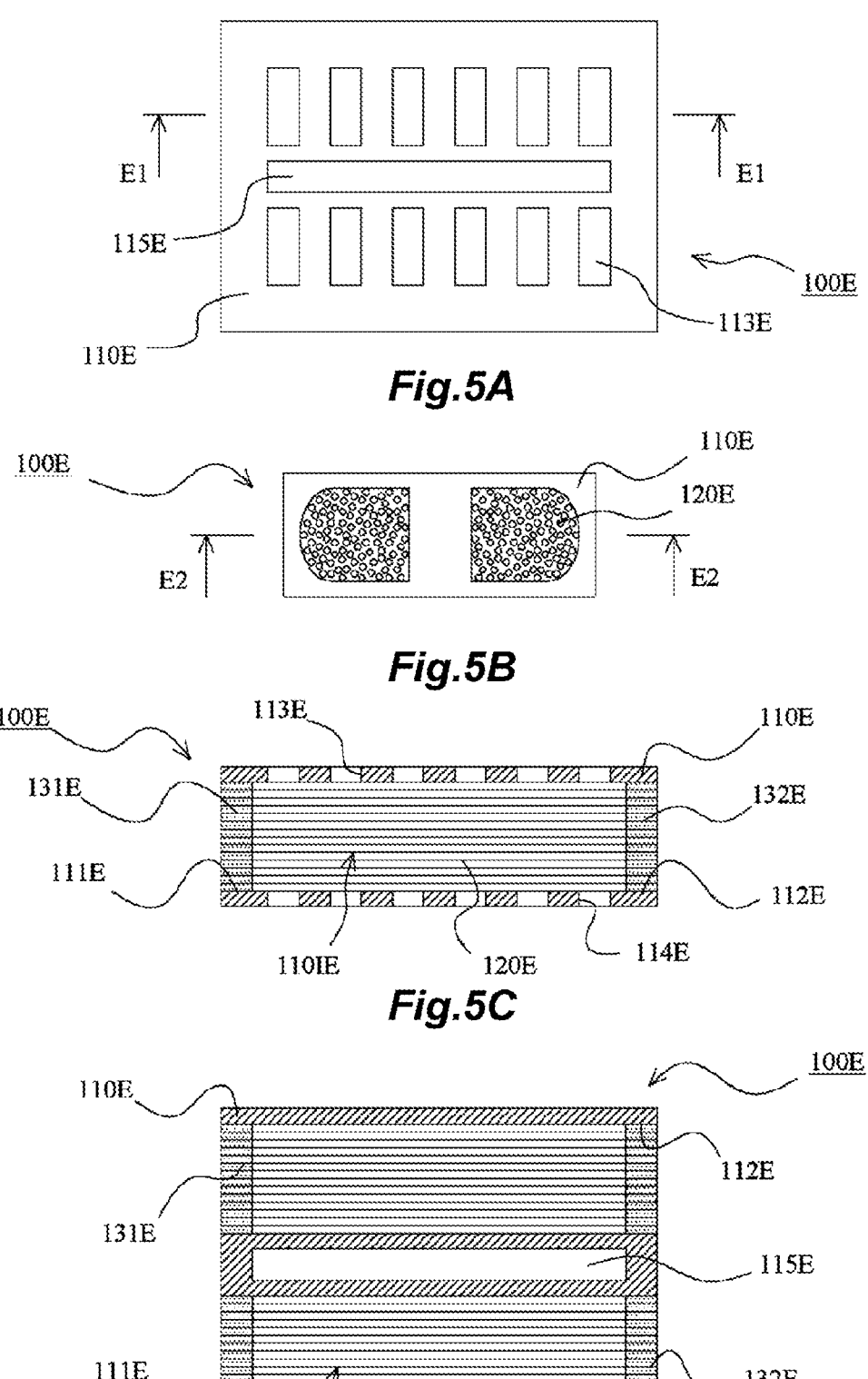
FIGS. 5A, 5B, 5C, and 5D are schematic configuration diagrams of a hollow fiber membrane module according to Embodiment 5 of the present invention.

A hollow fiber membrane module according to Embodiment 5 of the present invention will be explained with reference to FIG. 5. FIG. 5 is a schematic configuration diagram of a hollow fiber membrane module according to Embodiment 5 of the present invention. FIG. 5(*a*) is a plan-view diagram of a hollow fiber membrane module, FIG. 5(*b*) is a front-view diagram of the hollow fiber membrane module, FIG. 5(*c*) is an E1-E1 cross-sectional diagram of FIG. 5(*a*), and FIG. 5(*d*) is an E2-E2 cross-sectional diagram of FIG. 5(*b*).

<Overview of the Hollow Fiber Membrane Module>

The hollow fiber membrane module 100E according to the present embodiment includes a case 110E, a hollow fiber membrane bundle 120E made up of a plurality of hollow fiber membranes accommodated in the case 110E, and a pair of sealing and fixing parts 131E, 132E that fixes the hollow fiber membrane bundle 120E to the case 110E. The case 110E is made up of a cuboid-shaped tubular member. The hollow fiber membrane bundle 120E is accommodated in a housing interior 110IE such that both ends of the case 110E thus configured are open. The pair of sealing and fixing parts 131E, 132E, at one end side and the other end side of the case 110E, seals respective openings 111E, 112E at respective ends of the case 110E in a state where the hollow interior of the hollow fiber membranes is left open, and fixes the hollow fiber membrane bundle 120E to the case 110E.

<Application Example of the Hollow Fiber Membrane Module>

As explained concerning Embodiment 1, also the hollow fiber membrane module 100E according to the present embodiment can be used as a humidifier or a dehumidifier. The flow of dry gas and moist gas when the hollow fiber membrane module 100E is used as a humidifier or dehumidifier is as explained in Embodiment 1. That is, the intra-membrane channels are configured so that a dry gas flows from one end side of the case 110E, through the hollow interior of the plurality of hollow fiber membranes, to the other end side of the case 110E. The extra-membrane channels are configured so that a moist gas flows from inlets 113E formed in the case 110E, through the housing interior 110IE, to outlets 114E formed in the case 110E. A plurality of through-holes provided in one of a pair of plate-like portions of the case 110E corresponds to respective inlets 113E, and a plurality of through-holes provided in the other of the pair of plate-like portions corresponds to respective outlets 114E.

The humidification and dehumidification mechanisms elicited by the membrane separation effect are as explained concerning Embodiment 1. Similarly to Embodiment 1, also in the hollow fiber membrane module 100E according to the present embodiment can be suitably used as a humidifier for humidifying an electrolyte membrane that is provided in a fuel cell.

<Details on the Hollow Fiber Membrane Module>

In the hollow fiber membrane module 100E according to the present embodiment there is provided a second channel 115E that runs through the case 110E in a direction that intersects a direction from one end side towards the other end side of the case 110E, such that part of the moist gas flows through the second channel 115E without passing through the housing interior 110IE. That is, the second channel 115E is provided so that part of the moist gas flows therethrough but without passing through the extra-membrane channels. The second channel 115E will be explained more specifically next. The housing interior 110IE of the case 110E according to the present embodiment is divided by a partition wall. The hollow fiber membrane bundle 120E is thus divided and accommodated at two sites. The second channel 115E is provided so as to run through the above partition wall. In the present embodiment a configuration is depicted in which the housing interior 110IE is divided into two by one partition wall, but a configuration may be adopted in which the housing interior 110IE is divided into a plurality thereof by two or more partition walls. In that case the hollow fiber membrane bundle 120E is thus divided and accommodated at more sites. The second channel 115E can be provided in each partition wall.

The hollow fiber membrane module 100E thus configured allows reducing pressure loss of the moist gas, since part of the moist gas flows through the second channel 115E without passing through the housing interior 110IE of the case 110E (in other words, without passing through the extra-membrane channels). As a result, this allows curtailing increases in the size of the hollow fiber membrane module 100E.

Embodiment 6

Figures 6A, 6B, 6C, 6D:
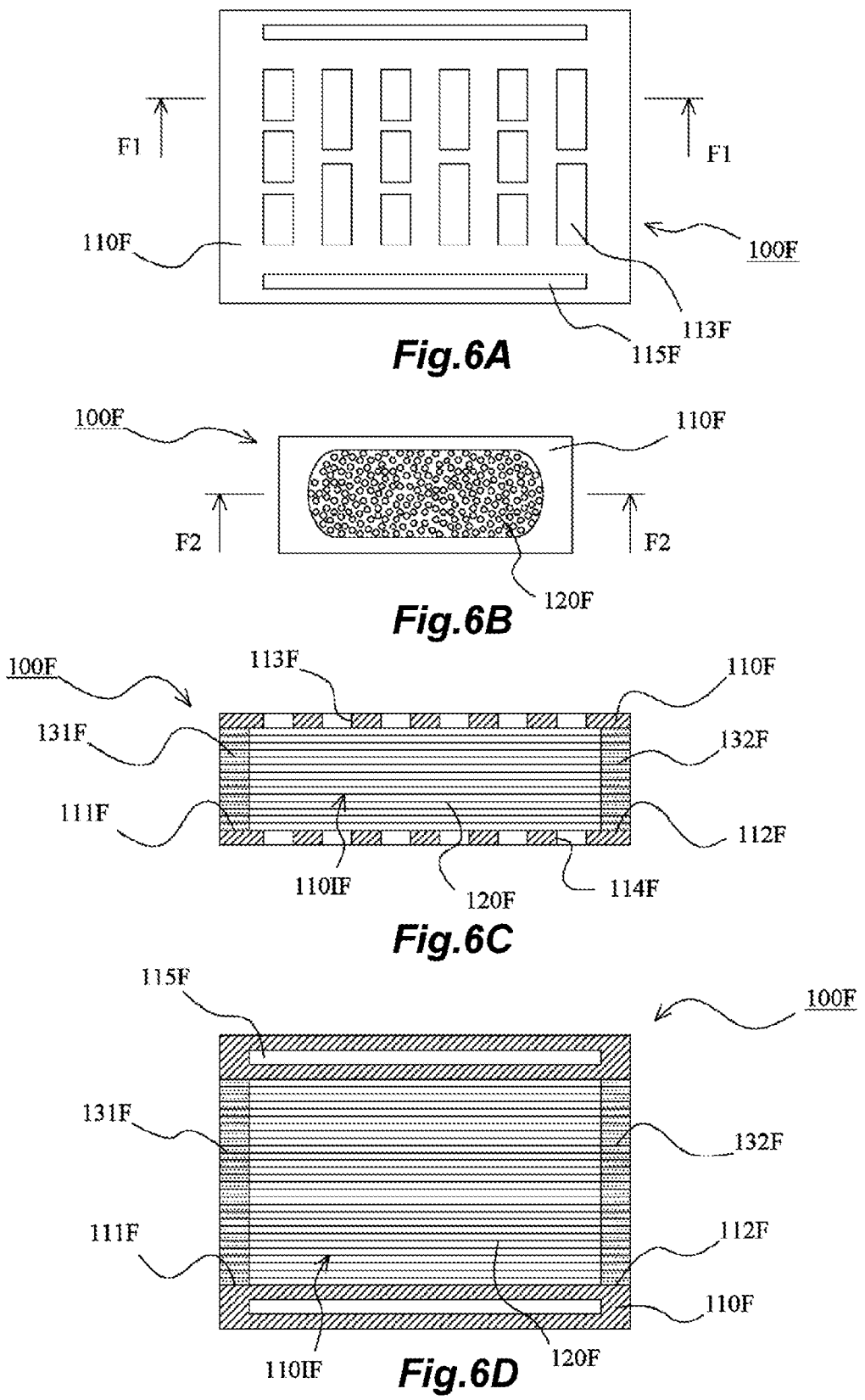
FIGS. 6A, 6B, 6C, and 6D are schematic configuration diagrams of a hollow fiber membrane module according to Embodiment 6 of the present invention.

A hollow fiber membrane module according to Embodiment 6 of the present invention will be explained with reference to FIG. 6. FIG. 6 is a schematic configuration diagram of a hollow fiber membrane module according to Embodiment 6 of the present invention. FIG. 6(a) is a plan-view diagram of a hollow fiber membrane module, FIG. 6(b) is a front-view diagram of the hollow fiber membrane module, FIG. 6(c) is a F1-F1 cross-sectional diagram of FIG. 6(a), and FIG. 6(d) is an F2-F2 cross-sectional diagram of FIG. 6(b).

<Overview of the Hollow Fiber Membrane Module>

A hollow fiber membrane module 100F according to the present embodiment includes a case 110F, a hollow fiber membrane bundle 120F made up of a plurality of hollow fiber membranes accommodated in the case 110F, and a pair of sealing and fixing parts 131F, 132F that fixes the hollow fiber membrane bundle 120F to the case 110F. The case 110F is made up of a cuboid-shaped tubular member. The hollow fiber membrane bundle 120F is accommodated in a housing interior 110IF such that both ends of the case 110F thus configured are open.

The pair of sealing and fixing parts 131F, 132F, at one end side and the other end side of the case 110F, seals respective openings 111F, 112F at respective ends of the case 110F in a state where the hollow interior of the hollow fiber membranes is left open, and fixes the hollow fiber membrane bundle 120F to the case 110F.

<Application Example of the Hollow Fiber Membrane Module>

As explained concerning Embodiment 1, also the hollow fiber membrane module 100F according to the present embodiment can be used as a humidifier or a dehumidifier. The flow of dry gas and moist gas when the hollow fiber membrane module 100F is used as a humidifier or dehumidifier is as explained in Embodiment 1. That is, the intra-membrane channels are configured so that a dry gas flows from one end side of the case 110F, through the hollow interior of the plurality of hollow fiber membranes, to the other end side of the case 110F. The extra-membrane channels are configured so that a moist gas flows from inlets 113F formed in the case 110F, through the housing interior 110IF, to outlets 114F formed in the case 110F. A plurality of through-holes provided in one of a pair of plate-like portions of the case 110F corresponds to respective inlets 113F, and a plurality of through-holes provided in the other of the pair of plate-like portions corresponds to respective outlets 114F.

The humidification and dehumidification mechanisms elicited by the membrane separation effect are as explained concerning Embodiment 1. Similarly to Embodiment 1, also the hollow fiber membrane module 100F according to the present embodiment can be suitably used as a humidifier for humidifying an electrolyte membrane that is provided in a fuel cell.

<Details on the Hollow Fiber Membrane Module>

In the hollow fiber membrane module 100F according to the present embodiment there is provided a second channel 115F that runs through the case 110F in a direction that intersects a direction from one end side towards the other end side of the case 110F, such that part of the moist gas flows through the second channel 115F without passing through the housing interior 110IF. That is, the second channel 115F is provided so that part of the moist gas flows therethrough but without passing through the extra-membrane channels. The second channel 115F will be explained more specifically next. This second channel 115F is provided so as to run through an outer wall of the case 110F between the outer peripheral wall surface thereof and the housing interior 110IF. In the present embodiment an instance is illustrated in which the second channel 115F is provided on both sides of the housing interior 110IF in the width direction, but a configuration may also be adopted in which the second channel 115F is provided on one side alone.

The hollow fiber membrane module 100F thus configured allows reducing pressure loss of the moist gas, since part of the moist gas flows through the second channel 115F without passing through the housing interior 110IF of the case 110F (in other words, without passing through the extra-membrane channels). As a result, this allows curtailing increases in the size of the hollow fiber membrane module 100E.

Others

A configuration resulting from combining two or more of the configurations illustrated in Embodiments 1 to 4 may be adopted in the first channel through which part of the dry gas flows without passing through the intra-membrane channels. A configuration resulting from combining the configurations illustrated in Embodiments 5 and 6 may be adopted in the second channel through which part of the moist gas flows without passing through the extra-membrane channels. In a case where both dry gas pressure loss and moist gas pressure loss are to be reduced, there may be adopted a configuration resulting from combining at least any one of the configurations of Embodiments 1 to 4, and at least one configuration from among those of Embodiments 5 and 6.

Examples of instances where a dry gas as a first gas flows through intra-membrane channels and a first channel, and a moist gas as a second gas flows through extra-membrane channels and a second channel have been explained in the above embodiments. However, a moist gas as a first gas may be set to flow through the intra-membrane channels and the first channel, and a dry gas as a second gas may be set to flow through the extra-membrane channels and the second channel.

In Embodiment 4 an instance has been illustrated in which the first channel is provided by providing a tubular member, whereas in the other embodiments the first channel is provided in the case itself. Adopting the latter approach is advantageous herein in terms of making it possible to reduce the number of parts and reduce costs in that mold costs incurred for instance in producing the tubular member are rendered unnecessary.

REFERENCE SIGNS LIST 100A, 100B, 100C, 100D, 100E, 100F Hollow fiber membrane module
110A, 110B, 110C, 110D, 110E, 110F Case
110IA, 110IB, 110IC, 110ID, 110IE, 110IF Housing interior
111A, 111B, 111C, 111D, 111E, 111F Opening
112A, 112B, 112C, 112D, 112E, 112F Opening
113A, 113B, 113C, 113D, 113E, 113F Inlet
114A, 114C, 114D, 114E, 114F Outlet
115A, 115B, 115C, 115D First channel
115E, 115F Second channel
120A, 120B, 120C, 120D, 120E, 120F Hollow fiber membrane bundle
131A, 131B, 131C, 131D, 131E, 131F Sealing and fixing part
132A, 132B, 132C, 132D, 132E, 132F Sealing and fixing part

The invention claimed is:

1. A hollow fiber membrane module, comprising:
a hollow fiber membrane bundle made up of a plurality of hollow fiber membranes;
a case of which both ends are open and in a housing interior of which the hollow fiber membrane bundle is accommodated;
a pair of sealing and fixing parts that seals respective openings at respective ends of the case in a state where a hollow interior of the hollow fiber membranes is left open and that fixes the hollow fiber membrane bundle to the case at one end side and another end side of the case;
intra-membrane channels configured to allow at least a part of a first gas to flow therein from one end side of the case to the other end side of the case through the hollow interior of the plurality of hollow fiber membranes; and
extra-membrane channels configured to allow at least a part of a second gas to flow therein from an inlet formed in the case to an outlet formed in the case through the housing interior, the extra-membrane channels passing over the exterior of the hollow fiber membranes,
one of the first gas and the second gas being a dry gas and the other being a moist gas having higher humidity than that of the dry gas, whereby moisture in the moist gas is supplied into the dry gas by virtue of a membrane separation effect of the hollow fiber membranes,
wherein at least one of a first channel and a second channel is provided, the first channel running through the case from one end side to the other end side and being configured to allow the rest of the first gas to flow therein without passing through the housing interior, and the second channel running through the case in a direction that intersects a direction from the one end side to the other end side of the case and being configured to allow the rest of the second gas to flow therein without passing through the housing interior.

2. The hollow fiber membrane module according to claim 1, wherein said housing interior is divided into a plurality of sites by a partition wall, and said hollow fiber membrane bundle is divisionally accommodated at the plurality of sites, the first channel being provided so as to run through the partition wall.

3. The hollow fiber membrane module according to claim 1, wherein the first channel is provided so as to run through an outer wall of the case between an outer peripheral wall surface thereof and the housing interior.

4. The hollow fiber membrane module according to claim 1, wherein the housing interior is divided into a plurality of sites by a partition wall, and the hollow fiber membrane bundle is divisionally accommodated at the plurality of sites, the second channel being provided so as to run through the partition wall.

5. The hollow fiber membrane module according to claim 1, wherein the second channel is provided so as to run through an outer wall of the case between an outer peripheral wall surface thereof and the housing interior.

* * * * *